United States Patent [19]

Lach et al.

[11] Patent Number: 4,675,021

[45] Date of Patent: Jun. 23, 1987

[54] AMPHOTERIC CONDENSATES AND THEIR USE IN RETANNING

[75] Inventors: Dietrich Lach, Friedelsheim; Rolf Streicher, Worms; Rainer Strickler, Heidelberg, all of Fed. Rep. of Germany

[73] Assignee: BASF Aktiengesellschaft, Ludwigshafen, Fed. Rep. of Germany

[21] Appl. No.: 694,278

[22] Filed: Jan. 24, 1985

[30] Foreign Application Priority Data

Jan. 24, 1984 [DE] Fed. Rep. of Germany ....... 3402265

[51] Int. Cl.$^4$ .............................................. C14C 3/18
[52] U.S. Cl. ................... 8/94.24; 8/94.19 R; 8/94.21; 8/636
[58] Field of Search ............................. 8/94.21, 94.24; 252/8.57; 525/473, 491, 495, 499, 515; 528/129, 150, 158, 161, 263, 265, 266, 257, 258, 261, 264

[56] References Cited

U.S. PATENT DOCUMENTS 4,390,340  6/1983  Lach ..................................... 8/94.24

FOREIGN PATENT DOCUMENTS 1247328   8/1967  Fed. Rep. of Germany .
2843233  10/1978  Fed. Rep. of Germany .
2070632   9/1981  United Kingdom .

Primary Examiner—Paul Lieberman
Assistant Examiner—John F. McNally
Attorney, Agent, or Firm—Oblon, Fisher, Spivak, McClelland & Maier

[57] ABSTRACT

Amphoteric condensates of the general formula I

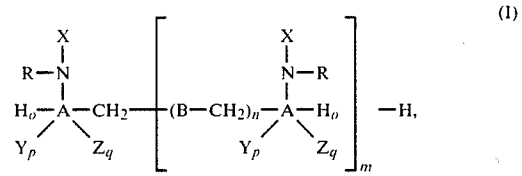

where A is a benzene or naphthyl radical, B is a radical derived from the group consisting of urea, biuret, dicyanodiamide or melamine, or a mixture of these radicals, X is —CH$_2$—COOH, CH$_3$—CH—COOH, CH$_3$—CH$_2$—CH—COOH, (CH$_3$)$_2$C—COOH or —CH$_2$—CH$_2$—COOH, R is H, alkyl of 1 to 4 carbon atoms or one of the radicals, X, Y is —CH$_2$SO$_3$H or —SO$_3$H, Z is alkyl of 1 to 4 carbon atoms or alkoxy of 1 to 4 carbon atoms, m is from 1 to 10, n is from 0 to 5, p is from 0 to 2, q is from 0 to 2, and o is 4-(p+q) if A is benzene, and is 6-(p+q) if A is naphthyl, and their alkali metal and ammonium salts for retanning, and a process for retanning and dyeing mineral tanned leathers 2 Claims, No Drawings

AMPHOTERIC CONDENSATES AND THEIR USE IN RETANNING

The present invention relates to a tanning agent based on a condensate of aromatic amines, for retanning chrome tanned leathers.

Synthetic tanning agents prepared by condensing aromatic sulfonic acids with aldehydes, in particular formaldehyde, have been disclosed. They give soft, well-filled leather and are simple to use. However, the leather tanned or retanned with these agents is difficult to dye in full shades with anionic dyes.

For example, the synthetic tanning agents described in German Laid-Open Application DOS No. 2,843,233 can also be used for retanning leathers. These tanning agents in particular improve the receptivity of leather, tanned or retanned with the said agent, for anionic dyes. However, they have the disadvantage that they cannot be combined with synthetic tanning agents, for example those based on phenolsulfonic acid, naphthalenesulfonic acid or naphtholsulfonic acid, without virtually completely losing their advantageous effect on the dye receptivity of the leather, i.e. the lightening effect of the combination of a conventional synthetic tanning agent with a prior art tanning agent is predominantly determined by the former tanning agent.

It is an object of the present invention to provide tanning agents which retain their good effect on the dye receptivity of the leather even in combination with conventional syntans.

We have found that this object is achieved, and that amphoteric condensates of the general formula I

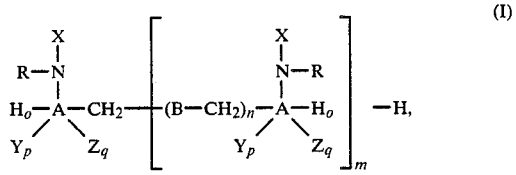

where A is a benzene or naphthyl radical (that is, a benzene or naphthalene ring), B is a radical derived from the group consisting of urea, biuret, dicyanodiamide and melamine, or a mixture of these radicals (that is, the radical derived by removing two hydrogen atoms from each of said compounds and in condensate (I) the B's may be different when n is greater than 1), X is $-CH_2-COOH$, $CH_3-CH-COOH$, $CH_3-CH_2-CH-COOH$, $(CH_3)_2-C-COOH$ or $-CH_2-CH_2-COOH$, R is H, alkyl of 1 to 4 carbon atoms or one of the radicals X, Y is $-CH_2SO_3H$ or $-SO_3H$, Z is alkyl of 1 to 4 carbon atoms or alkoxy of 1 to 4 carbon atoms, m is from 1 to 10, n is from 0 to 5, p is from 0 to 2, q is from 0 to 2, and o is 4-(p+q) where A is benzene, and is 6-(p+q) where A is naphthyl, and their alkali metal and ammonium salts can advantageously be used for a retanning process.

The novel amphoteric condensates can be prepared by various methods.

For example, an aromatic amine of the general formula II

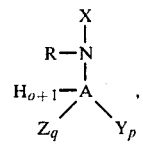

where A, R, X, Y, Z, p, q and o have the meanings given for formula I, can be condensed with formaldehyde and, if required, one or more compounds from the group consisting of urea, biuret, dicyanodiamide and melamine, in the presence or absence of a sulfite.

In another version of this method of preparation, an aromatic amine of the formula III

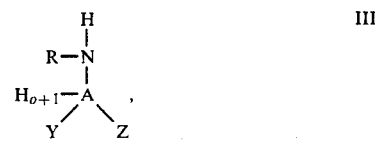

where R is hydrogen or alkyl of 1 to 4 carbon atoms and Z, Y and o have the meanings given for formula I, can first be reacted with an alkylating derivative of a carboxylic acid corresponding to the radical X, and the resulting amine of the general formula II can, without prior isolation, be converted to a condensate of the formula I.

If, in the novel amphoteric condensate of the formula II, Y is $-CH_2SO_3H$, the following procedure can be adopted: a compound of the formula I, where Y is hydrogen, can first be prepared, and the radical $-CH_2SO_3H$ can then be introduced by means of a sulfomethylation reaction. In this way, it is possible to introduce sulfomethyl groups into only some of the starting material, so that a mixture of novel condensates with and without methylenesulfonyl groups is formed.

In another method of preparation, an aromatic amine of the general formula III is first condensed with formaldehyde and, if required, one or more compounds from the group consisting of urea, biuret, dicyanodiamide and melamine, and the product is then reacted with an alkylating derivative of a low molecular weight carboxylic acid, in particular a halogen derivative, corresponding to the radical X.

The condensation reactions are preferably carried out in aqueous solutions at from 40° to 140° C., preferably from 60° to 100° C., and at a pH of from 4 to 9, preferably from 5 to 8. Frequently, the resulting solution can be used according to the invention exactly in this form. On the other hand, the novel condensates can readily be obtained in solid powder form, the spray drying method being particularly suitable for this purpose. Where the compounds of the formula I are to be isolated in solid form, it is of course advantageous if concentrated solutions are used as far as possible. Reaction solutions having a solids content of 50% in respect of a compound of the formula I can be obtained without difficulty.

It may be mentioned that the stated procedural measures for the condensation reactions to be carried out are effected in a conventional manner, and it is noted that mixtures are formed in some of the condensation reactions described, as is known to any skilled worker in this field.

If A is a naphthyl ring, it is particularly advantageous for Y to be SO$_3$H, in order to achieve adequate solubility in aqueous media.

Particularly preferred radicals B to be incorporated are those derived from urea or melamine, and very good results are also obtained with mixtures of urea and melamine.

X is particularly preferably the acetic acid radical. The radical X is advantageously introduced by means of a substitution reaction with an appropriate halocarboxylic acid, in particular an aliphatic chlorocarboxylic acid.

R is particularly preferably hydrogen and Y is particularly preferably —CH$_2$—SO$_3$H, and any benzene ring A present is unsubstituted by a Y substituent or substituted by only one Y substituent.

The novel amphoteric condensates of the formula I are particularly useful for retanning mineral tanned leathers.

The particular advantage of the tanning agent used according to the invention is that it is possible to employ combinations with the conventional and much used synthetic tanning agents, extremely level and intense dyeings being obtained on leather. This is a surprising effect which was completely unforeseeable. Conventional synthetic tanning agents are, in particular, the prior art ones stated bn page 1.

These advantageous results are obtained in the retanning process when a very special procedure is employed.

The present invention therefore also relates to a process for retanning and dyeing mineral tanned leathers, in which amphoteric condensates of the general formula I are used, and dyeing is then carried out at a pH of from 3 to 4.5 with anionic dyes.

In a particularly advantageous and preferred embodiment with regard to the dyed leather, the tanning agents of the general formula I are used together with synthetic tanning agents based on phenolsulfonic acid, naphthalenesulfonic acid and/or naphtholsulfonic acid.

As a rule, the process for retanning and dyeing of mineral tanned leather is carried out as follows: neutralized mineral tanned leather is treated in an aqueous medium with from 0.5 to 15%, based on the shaved weight, of a condensate of the formula I using a liquor length of from 50 to 600%, based on the shaved weight, of water, at from 15° to 60° C. in the course of from 10 to 180 minutes, and then with a conventional synthetic tanning agent and/or an anionic polymeric tanning agent based on acrylic acid, maleic anhydride or methacrylic acid or copolymers of these with other ethylenically unsaturated monomers, after which, if required, dyeing is carried out and, if necessary, fat-liquoring is effected with a conventional fatliquoring agent for leather, the pH is then brought to 3-4.5, preferably 3.5-4.0, and the leather is dyed.

In this procedure, suitable amounts of the condensate of the formula I are in particular from 1 to 10%, particularly preferably from 2 to 5%, based on the shaved weight, preferred liquor lengths correspond to 100-400%, based on the shaved weight, of water, suitable temperatures are in particular from 25° to 50° C., particularly preferably from 35° to 45° C., and suitable times are from 10 to 90 minutes. The pH is advantageously established using a lower aliphatic carboxylic acid, in particular formic acid or acetic acid.

The dyes used are commercial anionic dyes, and the fatliquors employed are commercial natural and/or synthetic greasing agents.

In the Examples which follow, parts and percentages are by weight, unless stated otherwise.

Apart from the novel polymeric tanning agents, the starting materials stated in the Examples are available commercially.

EXAMPLE 1

48 parts of chloroacetic acid were dissolved in 140 parts of water and the solution was neutralized with 80 parts of 50% strength sodium hydroxide solution. Thereafter, 54 parts of o-toluidine were added dropwise in the course of 15 minutes, and stirring was continued for 120 minutes at 95° C. 30 parts of urea were then introduced, and 100 parts of a 30% strength aqueous formaldehyde solution were added dropwise in the course of 30 minutes at 90° C. Stirring was continued for a further 60 minutes at 90° C., and the tanning agent was finally isolated by spray drying.

USE EXAMPLE I

The tanning agent obtained as described in Example 1 was used for retanning as follows: 100 parts of chrome leather still moist from the shaving procedure and having a shaved thickness of 1.5 mm, in 100 parts of water, were first neutralized at 30° C. with 1 part of sodium formate and 0.4 part of sodium bicarbonate in a kicker. The leather, in 100 parts of fresh aqueous liquor and at 40° C., was then first drummed with 3 parts of the novel tanning agent for 10 minutes, after which 4 parts of a commercial white tanning agent were added and drumming was continued for a further 60 minutes. Acidification was then effected in 200 parts of fresh liquor at 50° C. using 0.5 parts of formic acid and, after drumming had been carried out for 10 minutes, 1 part of Acid Brown 165 was added. Drumming was carried out for a further 20 minutes, after which 4 parts of a commercial fatliquor were added to the liquor. After drumming had been carried out for a further 40 minutes, acidification was finally effected with 0.5 part of formic acid. The leather was finally dried, and finished in a conventional manner.

For comparison, a second leather was retanned, dyed and fatliquored in exactly the same way, except that a commercial fine-particled syntan based on phenolsulfonic acid was used instead of the novel tanning agent.

The leather treated with the product according to the invention exhibited a substantially deeper dyeing.

EXAMPLE 2

48 parts of chloroacetic acid were dissolved in 130 parts of water and the solution was neutralized with 80 parts of 50% strength sodium hydroxide solution. Thereafter, 46.5 parts of aniline were added dropwise in the course of 5 minutes, and stirring was continued for 60 minutes at 90° C. 47.5 parts of sodium disulfite were then added, and stirring was continued for a further 60 minutes at 95° C. 30 parts of urea were then added, 100 parts of a 30% strength aqueous formaldehyde solution were added dropwise in the course of 60 minutes at 70° C., and stirring was then continued for a further 120 minutes at 80° C. The tanning agent was then isolated by spray drying.

USE EXAMPLE II

The tanning agent obtained as described in Example 2 was used for retanning as follows: 100 parts of chrome leather still moist from the shaving procedure and having a shaved thickness of 0.9 mm, in 100 parts of water, were first neutralized at 30° C. with 1 part of sodium formate and 0.4 part of sodium bicarbonate in a kicker. The leather, in 200 parts of fresh aqueous liquor and at 50° C., was then first drummed with 5 parts of the novel tanning agent for 10 minutes, after which 4 parts of a commercial replacement tanning agent were added and drumming was continued for a further 60 minutes. Acidification was then effected in 200 parts of fresh liquor at 50° C. using 0.5 part of formic acid and, after drumming had been carried out for 10 minutes, 1 part of Acid Brown 321 was added. Drumming was carried out for a further 20 minutes, after which 4 parts of a commercial fatliquor were added to the liquor. After drumming had been carried out for a further 40 minutes, acidification was finally effected with 0.5 part of formic acid. The leather was finally dried, and finished in a conventional manner.

For comparison, a second leather was retanned, dyed and fatliquored in exactly the same manner, except that the product described in German Laid-Open Application DOS No. 2,843,233, Example 7, was employed instead of the novel tanning agent.

The leather treated with the novel tanning agent exhibited a substantially deeper dyeing.

EXAMPLE 3

80 parts of 50% strength sodium hydroxide solution were added dropwise to 48 parts of chloroacetic acid and 46.5 parts of aniline in 130 parts of water at 95° C. in the course of 15 minutes, after which stirring was continued for 30 minutes at 95° C. Thereafter, 47.5 parts of sodium disulfite were added, and stirring was continued for a further 20 minutes at 95° C. Finally, 20 parts of urea and 10 parts of melamine were added, and 100 parts of a 30% strength aqueous formaldehyde solution were added dropwise in the course of 30 minutes at 80° C., and stirring was continued for 1 hour at 95° C. The solution obtained was then spray dried.

USE EXAMPLE III

The tanning agent of Example 3 was used by a method similar to that described in Example I, except that the retanning process was carried out at 300° C. in 200 parts of liquor. The result corresponded to that of Example I.

EXAMPLE 4

80 parts of 50% strength sodium hydroxide solution were added dropwise to 48 parts of chloroacetic acid and 46.5 parts of aniline in 130 parts of water at 95° C. in the course of 15 minutes, after which stirring was continued for 30 minutes at 95° C. Thereafter, 47.5 parts of sodium disulfite were added, the mixture was stirred for 20 minutes at 95° C., 10 parts of urea and 10 parts of melamine were added, and 100 parts of a 30% strength aqueous formaldehyde solution were added dropwise at 70° C. Finally, the mixture was stirred for a further 90 minutes at 90° C., and the resulting solution was spray dried.

USE EXAMPLE IV

The tanning agent of Example 4 was used by a method similar to that described in Example II. The result corresponded to that of Example II.

EXAMPLE 5

46.5 parts of aniline were added to a solution of 60 parts of sodium chloroacetate in 144 parts of water, the mixture was stirred for 30 minutes at 95° C., and 20 parts of 50% strength sodium hydroxide solution were added dropwise in the course of 20 minutes. Thereafter, 60 parts of sodium disulfite were added and stirring was continued for a further 30 minutes at 95° C. Finally, 20 parts of urea and 10 parts of melamine were added, and 50 parts of a 30% strength formaldehyde solution were added dropwise. Stirring was continued for a further 60 minutes at 95° C., and the solution was then spray dried.

USE EXAMPLE V

The tanning agent obtained as described in Example 5 was used for retanning as follows: 100 parts of chrome tanned sheep leather in 200 parts of water were first neutralized with 1 part of sodium formate and 0.4 part of sodium bicarbonate at 35° C. in a kicker. Thereafter, the leather, in 400 parts of fresh aqueous liquor and at 40° C., was first drummed with 10 parts of the novel tanning agent for 10 minutes, after which 8 parts of a commercial white tanning agent were added and drumming was continued for a further 60 minutes. Acidification was then effected in 400 parts of fresh liquor at 50° C. using 0.5 part of formic acid and, after drumming had been carried out for 10 minutes, 2 parts of Acid Brown 161 were added. Drumming was carried out for a further 20 minutes, after which 8 parts of a commercial fatliquor were added to the liquor. After drumming had been carried out for a further 40 minutes, acidification was finally effected with 0.5 part of formic acid. The leather was finally dried, and finished in a conventional manner.

For comparison, a second leather was retanned, dyed and fatliquored in exactly the same way, except that the product described in German Laid-Open Application DOS No. 2,843,233, Example 7, was used instead of the novel tanning agent.

The leather treated with the novel tanning agent exhibited a substantially deeper dyeing.

EXAMPLE 6

55.8 parts of aniline were added to a solution of 48 parts of chloroacetic acid and 60 parts of 50% strength sodium hydroxide solution. Stirring was continued for 60 minutes at 90° C., after which 20 parts of 50% strength sodium hydroxide solution and 47.5 parts of sodium disulfite were added. Thereafter, stirring was continued for 120 minutes at 90° C., after which 30 parts of urea were added and 100 parts of 30% strength aqueous formaldehyde solution were added dropwise in the course of 30 minutes at 90° C. Finally, stirring was continued for a further 210 minutes at 90° C., and the resulting solution was then spray dried.

USE EXAMPLE VI

The tanning agent obtained as described in Example 6 was used for retanning as follows: 100 parts of chrome side leather still moist from the shaving procedure and hing a shaved thickness of 2.0 mm, in 100 parts of water, were first neutralized with 1.5 parts of sodium formate and 0.5 part of sodium bicarbonate at 30° C. in a kicker. Thereafter, the leather in 100 parts of fresh aqueous liquor at 30° C. was first drummed for 10 minutes with 3 parts of the tanning agent of Example 11, after which 2 parts of a polymer tanning agent based on acrylic acid/acrylonitrile were added, and finally 3 parts of a synthetic tanning agent based on phenolsulfonic acid, 2 parts of a commercial resin tanning agent and 1 part of mimosa tanning agent were introduced into the liquor. Drumming was then continued for a further 40 minutes.

The leather, in 200 parts of fresh liquor, was then acidified with 0.7 part of formic acid at 50° C. and, after drumming had been carried out for 10 minutes, 1.5 parts of Acid Brown 75 were added. Drumming was continued for a further 20 minutes, after which 6 parts of a commercial fatliquor were introduced into the liquor. After drumming had been carried out for a further 40 minutes, acidification was finally effected with 1 part of formic acid. The leather was finally dried, and finished in a conventional manner.

For comparison, a second leather was retanned, dyed and fatliquored in exactly the same way, except that a commercial fine-particled system based on phenolsulfonic acid was used instead of the novel tanning agent.

The leather treated with the novel product exhibited a substantially deeper dyeing.

EXAMPLE 7

46.5 parts of aniline and 48 parts of chloroacetic acid, dissolved in 60 parts of water, were stirred for 30 minutes at 70° C. Thereafter, 30 parts of urea were added and 100 parts of 30% strength aqueous formaldehyde solution and 55 parts of 50% strength sodium hydroxide solution were simultaneously added dropwise in the course of 60 minutes at the stated temperature. 52 parts of sodium disulfite were then added, stirring was continued for 120 minutes at 90° C., and the mixture was then diluted with 81.5 parts of water. A 50% strength aqueous solution was obtained.

USE EXAMPLE VII

The resulting solution of tanning agent was used in a procedure similar to that described in Example I. The result was correspondingly advantageous.

EXAMPLE 8

48 parts of chloroacetic acid, 40 parts of 50% strength sodium hydroxide solution and 23 parts of aniline, dissolved in 102 parts of water, were stirred for 30 minutes at 95° C. Thereafter, 30 parts of urea and 20 parts of 50% strength sodium hydroxide solution were added, and 50 parts of 30% strength aqueous formaldehyde solution were added dropwise in the course of 30 minutes at 90° C. Stirring was continued for 120 minutes at the same temperature, after which 95 parts of sodium disulfite were added, stirring was carried out for a further 120 minutes at 90° C. and the mixture was then diluted with 73 parts of water. The resulting 50% strength solution was spray dried.

USE EXAMPLE VIII

The tanning agent of Example 8 was used in a procedure similar to that described in Example V, except that, instead of chrome tanned sheep leather, chrome tanned goat leather was retanned. However, the result was correspondingly advantageous.

EXAMPLE 9

100 parts of 30% strength aqueous formaldehyde solution were added dropwise, in the course of 30 minutes, at 70° C. and while stirring, to 90 parts of a mixture of the sodium and potassium salts of phenylglycine, having a theoretical molecular weight of 180, 20 parts of formic acid and 60 parts of urea in 175 parts of water. Thereafter, stirring was continued for a further 60 minutes at 70° C., after which 105 parts of sodium disulfite were added and stirring was carried out for a further 120 minutes at 90° C. Finally, the solids content was brought to 50% with 40 parts of water, and the solution was then spray dried.

USE EXAMPLE IX

The tanning agent of Example 9 was used in a procedure similar to that described in Example I. The result was correspondingly advantageous.

EXAMPLE 10

200 parts of 30% strength aqueous formaldehyde solution were added dropwise, in the course of 50 minutes, at 90° C. and while stirring, to 180 parts of the phenylglycine salts stated in Example 9 and 120 parts of urea in 220 parts of water. The mixture was kept at 90° C. for 120 minutes, after which the pH was brought to 8.7 by adding 10 parts of formic acid. Finally, stirring was continued for a further 180 hours at 90° C., after which the resulting solution was cooled to room temperature, and brought to pH 5.9 with 5 parts of formic acid.

USE EXAMPLE X

The resulting solution of tanning agent was used in a procedure similar to that described in Example I. The result was correspondingly advantageous.

EXAMPLE 11

A solution of 111.5 parts of 1-aminonaphthalene-6-sulfonic acid, 48 parts of chloroacetic acid and 80 parts of 50% strength sodium hydroxide solution in 127 parts of water was stirred for 120 minutes at 90° C. Thereafter, 30 parts of urea were added, and 100 parts of 30% strength aqueous formaldehyde were added dropwise in the course of 30 minutes. The mixture was then diluted with 115 parts of water, and stirring was continued for 120 minutes at 95° C. 95 parts of sodium disulfite were then added, and finally stirring was carried out for a further 120 minutes at 95° C. The solution was then spray dried.

USE EXAMPLE XI

The resulting tanning agent was used in a procedure similar to that described in Example I. The result was correspondingly advantageous.

EXAMPLE 12

46 parts of α-chloropropionic acid were dissolved in 140 parts of water, and 80 parts of 50% strength sodium hydroxide solution were added. Thereafter, 54 parts of o-toluidine were added dropwise in the course of 5 minutes, and stirring was continued for 120 minutes at 95° C. 30 parts of urea were then added, and 100 parts of 30% strength aqueous formaldehyde solution were added dropwise in the course of 30 minutes at 90° C. Stirring was continued for a further 60 minutes at 90° C.

USE EXAMPLE XII

The resulting tanning agent was used in a procedure similar to that described in Example I. The result was correspondingly advantageous.

EXAMPLE 13

75 parts of chloroacetic acid were dissolved in 160 parts of water, and 54 parts of o-toluidine and 80 parts of 50% strength sodium hydroxide solution were added. Thereafter, the mixture was heated at 95° C., and 95 parts of sodium disulfite were added. The mixture was kept at 90° C. for 30 minutes, after which 200 parts of 30% strength formaldehyde solution were added dropwise in the course of 120 minutes. Finally, stirring was continued for a further 4 hours at 95° C., and the product was then spray dried.

USE EXAMPLE XIII

The resulting tanning agent was used in a procedure similar to that described in Example I. The result was correspondingly advantageous.

We claim:

1. A process for retanning and dyeing mineral tanned leather, wherein an amphoteric condensate as defined below is applied to leather together with a synthetic tanning agent based on phenolsulfonic acid, naphthalenesulfonic acid and/or naphtholsulfonic acid, for retanning mineral tanned and the leather is then dyed at pH 3–4.5 with an anionic dye, said amphoteric condensate being of the formula I

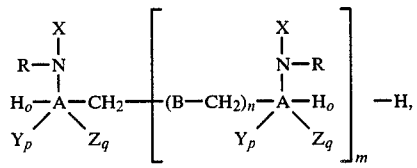

where A is a benzene ring or naphthalene ring, each B is a radical derived by removal of two hydrogen atoms from a compound from the group consisting of urea, biuret, dicyanodiamide and melamine, X is —CH$_2$COOH,

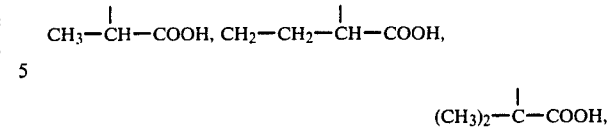

or —CH$_2$—CH$_2$—COOH, R is H, alkyl or 1 to 4 carbon atoms or one of the radicals X, Y is —CH$_2$SO$_3$H or —SO$_3$H, Z is alkyl or 1 to 4 carbon atoms or alkoxy of 1 to 4 carbon atoms, m is from 1 to 10, n is from 1 to 5, p is from 0 to 2, q is from 0 to 2, and o is 4-(p+q) if A is a benzene ring, and is 6-(p+q) if A is a naphthalene ring, and its alkali metal and ammonium salts.

2. A process for retanning and dyeing mineral tanned leather, wherein an amphoteric condensate as defined below is applied to leather together with a synthetic tanning agent based on phenolsulfonic acid, naphthalenesulfonic acid and/or naphtholsulfonic acid, monomers, for retanning mineral tanned leather, and the leather is then dyed at pH 3–4.5 with an anionic dye, said amphoteric condensate being of the formula I

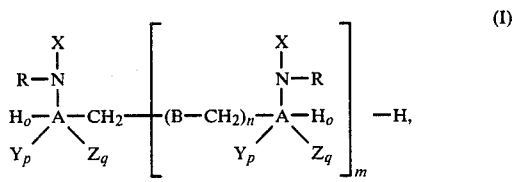

where A is a benzene ring, B is a urea radical or in the case that n is greater than 1, some B may be a melamine radical, where each urea and melamine radical is the radical derived by removing from urea and melamine respectively, X is —CH$_2$—COOH or

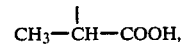

R is H, Y is —CH$_2$SO$_3$H, p is 1, q is 0 or 1, Z is methyl or H, Z is methyl when q is 1, q is 0 when Z is H, m is from 1 to 10, n is from 1 to 5, and o is 4-(p+q) and its alkali metal and ammonium salts.

* * * * *